US012077982B2

(12) United States Patent
Dunstan

(10) Patent No.: US 12,077,982 B2
(45) Date of Patent: Sep. 3, 2024

(54) SECURE CLOSURE

(71) Applicant: Lokaway Pty. Ltd., Cranbourne (AU)

(72) Inventor: Brett Dunstan, Cranbourne (AU)

(73) Assignee: Lokaway Pty Ltd, Cranbourne (AU)

( * ) Notice: Subject to any disclaimer, the term of this patent is extended or adjusted under 35 U.S.C. 154(b) by 736 days.

(21) Appl. No.: 16/934,721

(22) Filed: Jul. 21, 2020

(65) Prior Publication Data

US 2020/0347640 A1 Nov. 5, 2020

Related U.S. Application Data

(63) Continuation-in-part of application No. 15/547,888, filed as application No. PCT/AU2017/000052 on Feb. 22, 2017, now abandoned.

(51) Int. Cl.

| | |
|---|---|
| ***E05G 1/04*** | (2006.01) |
| ***E05B 17/20*** | (2006.01) |
| ***E05B 65/00*** | (2006.01) |
| ***E05G 1/026*** | (2006.01) |
| *A47B 81/00* | (2006.01) |

(52) U.S. Cl.

CPC ...... *E05B 17/2003* (2013.01); *E05B 65/0075* (2013.01); *E05G 1/026* (2013.01); *E05G 1/04* (2013.01); *A47B 81/005* (2013.01); *E05Y 2800/426* (2013.01)

(58) Field of Classification Search

CPC .... E05B 17/2003; E05B 65/0075; E05C 9/10; E05G 1/026; E05G 1/04; E05Y 2800/426; E05Y 2900/602; Y10T 70/7915; Y10T 70/7921; Y10T 70/7927

USPC ................ 109/59 R, 49.5, 58; 292/346, 357; 70/416–418

See application file for complete search history.

(56) References Cited

U.S. PATENT DOCUMENTS

| | | | |
|---|---|---|---|
| 1,399,897 | A | 12/1921 | Singer |
| 2,376,420 | A | 3/1945 | Davis |
| 2,766,605 | A | 10/1956 | O'Brien |
| 3,290,081 | A | 12/1966 | Sushan |

(Continued)

FOREIGN PATENT DOCUMENTS

| | | | |
|---|---|---|---|
| WO | 2004/033835 | A1 | 4/2004 |
| WO | 2006094368 | A1 | 9/2006 |

(Continued)

OTHER PUBLICATIONS

International Search Report prepared by the Australian Patent Office for PCT/AU2017/000052, mailed May 25, 2017, 5 pages.

(Continued)

*Primary Examiner* — Suzanne L Barrett

(74) *Attorney, Agent, or Firm* — Chernoff, Vilhauer, McClung & Stenzel, LLP

(57) ABSTRACT

A security door lock with a hinged door and a locking assembly. The door jamb has a number of apertures formed in a bolt receiving side of the jamb to receive a corresponding number of door bolts extendable from an outer free edge of the door. The locking assembly has a barrier panel spaced from the jamb to define a narrow longitudinal slot is adapted to receive a door guard member extending normally from an internal surface of the door adjacent the outer free edge, and is reinforced by the barrier panel against lateral flexing or distortion. A handle mechanism controls the lateral movement of the closure and the retraction or extension of the locking bolts.

12 Claims, 8 Drawing Sheets

(56) References Cited

U.S. PATENT DOCUMENTS

| | | | |
|---|---|---|---|
| 3,405,962 | A | 10/1968 | Sushan |
| 3,592,498 | A | 7/1971 | Raccuglia, Sr. |
| 4,345,787 | A | 8/1982 | Dabrowski |
| 4,725,084 | A | 2/1988 | Catricola |
| 5,321,961 | A | 6/1994 | Barberi |
| 5,850,796 | A | 12/1998 | Cislo |
| 6,494,064 | B1 | 12/2002 | Pena |
| 7,404,363 | B2 | 7/2008 | Dunstan |
| 2006/0037519 | A1 | 2/2006 | Dunstan |
| 2009/0260552 | A1 | 10/2009 | Dunstan |
| 2009/0313901 | A1 | 12/2009 | Dunstan |
| 2011/0163109 | A1 | 7/2011 | Dunstan |

FOREIGN PATENT DOCUMENTS

| | | | |
|---|---|---|---|
| WO | 2007006097 | A1 | 1/2007 |
| WO | 2007006098 | A1 | 1/2007 |
| WO | 2007033428 | A1 | 3/2007 |
| WO | 2009026623 | A1 | 3/2009 |
| WO | 2010025498 | A1 | 3/2010 |
| WO | 2011011821 | A1 | 2/2011 |

OTHER PUBLICATIONS

Written Opinion prepared by the Australian Patent Office for PCT/AU2017/000052, mailed May 25, 2017, 5 pages.
Office Action prepared by the US Patent and Trademark Office for U.S. Appl. No. 15/547,888, filed Oct. 13, 2018, 17 pages.
Final Office Action prepared by the US Patent and Trademark Office for U.S. Appl. No. 15/547,888, filed Mar. 28, 2019, 11 pages.
Office Action prepared by the US Patent and Trademark Office for U.S. Appl. No. 15/547,888, filed Sep. 24, 2019, 12 pages.
Final Office Action prepared by the US Patent and Trademark Office for U.S. Appl. No. 15/547,888, filed Jan. 21, 2020, 14 pages.

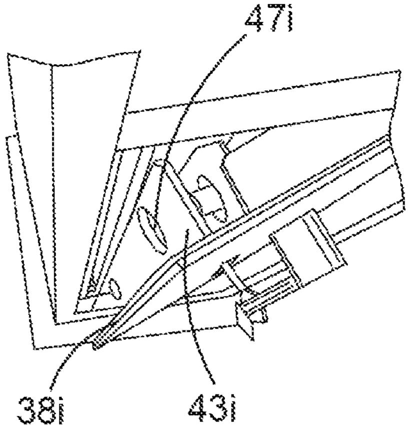
Fig. 2I
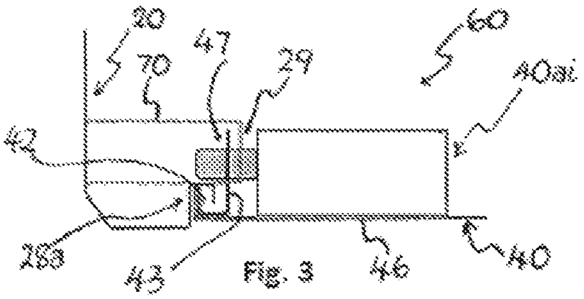
Fig. 3
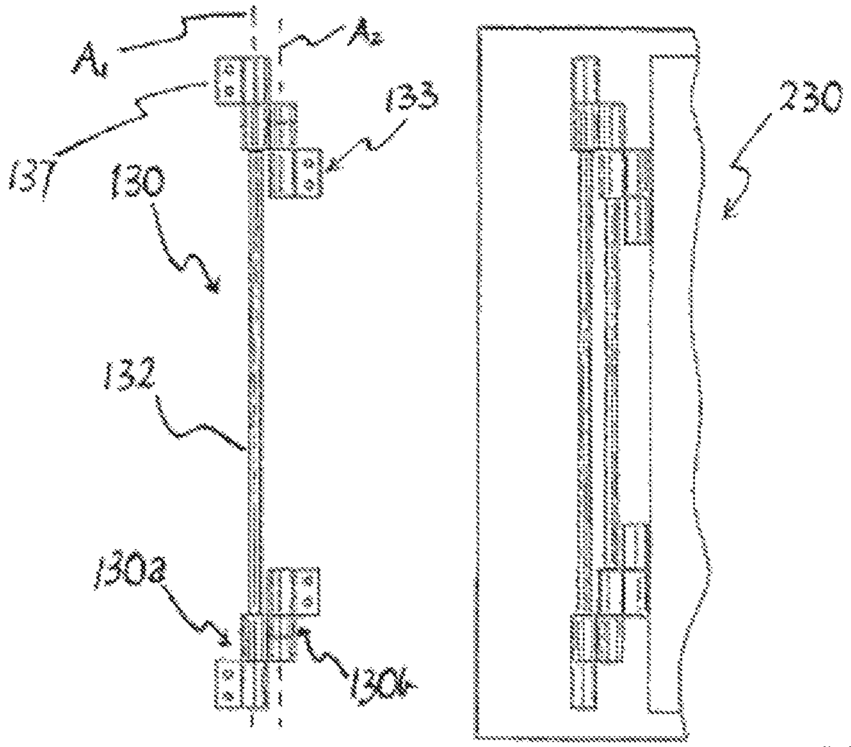
Fig. 4a
Fig4b
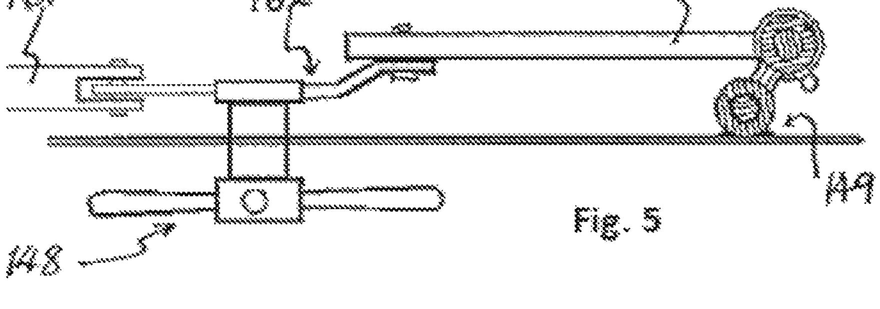
Fig. 5

SECURE CLOSURE

CROSS-REFERENCE TO RELATED APPLICATIONS

This application is a continuation-in-part of U.S. Ser. No. 15/547,888, filed Aug. 1, 2017, which is a national stage application filed under 35 USC 371 based on International Application No. PCT/AU2017/000052 filed Feb. 22, 2017 and claims priority under 35 USC 119 of Australian Patent Application No. 2016900634 filed Feb. 23, 2016.

FIELD OF INVENTION

This invention relates to a secure closure having a security door lock. More particularly, this invention relates to a secure closure having a security door lock for resisting unauthorised entry through the closure.

BACKGROUND ART

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

Security door locks have been described in which there is a gap between a door jamb and a door edge such that, with sufficient penetration and leverage, a lever may be used to jimmy or wedge between the jamb and edge. This may enable flexing and/or warping, thus weakening the structure and permitting unauthorised entry.

Early advancements in safe construction by the Applicant have been disclosed in WO2004/033835, WO2006/094368, WO2007/006097, WO2007/006098, WO2007/033428, WO2009/026623, WO2010025498 and WO2011011821 which describe various mechanisms for safe or security doors. However, prior art doors may still be vulnerable to unauthorised entry by attack between the door and frame using lever implements.

An object of the present invention is to ameliorate the aforementioned disadvantages of the prior art or to at least provide a useful alternative thereto.

STATEMENT OF INVENTION

The invention according to one or more aspects is as defined in the independent claims. Some optional and/or preferred features of the invention are defined in the dependent claims.

Accordingly, one aspect of the invention is provided in the following statement.

A secure closure having a security door lock comprising:

a jamb defining a closure space defined by the jamb's first and second side edges and the jambs top and bottom edges, the closure space extending in a closure plane between the first, second, top and bottom edges;

a hinge for mounting the closure on a hinged side near the first edge of the jamb, the closure having an exterior that extends in a door plane; and a locking bolt extendable from a free edge of the closure and receivable in a closed position in or near a second edge of the jamb, wherein:

the second edge includes a first outer wall and, spaced therefrom, a barrier panel aligned in a second plane substantially perpendicular to the closure plane and adapted to extend substantially the full length of the second edge;

a door guard member is adapted to extend from the closure at or near a free edge of the closure remote from and opposed to the hinged side;

the door guard member lies substantially in a guard plane extending transverse to the door plane;

the door guard member extends substantially the full length of the free edge;

the barrier member extends across the second edge in the second plane substantially parallel to the door guard member with the closure in the closed position, thereby forming, between the barrier member and the jamb, a slot facing outwardly and into which part or all of the door guard member can be received; and the path of travel of the locking bolt is adapted to intersect the barrier member and the door guard member in the closed position.

Closure and Secure Container

The closure and jamb arrangement may be adapted for use in respect of a toolbox, including a portable, permanent or vehicle-mounted toolbox, a strong room or vault, or a security safe or container, including a gun (or other weapons) safe.

The container may be a safe. The container may be made from metal or a composite including metal and insulation. The container may be for securing arms, such as guns, including rifles. Accordingly, containers made according to the invention may vary in size and shape, depending on the number of items required to be housed and their size and shape. For example, a container housing long barrel rifles may be between 900-1500 mm, in height or length. The container may be shaped and sized to house one or more pistols or other small firearms. The container may be adapted to lie substantially horizontally with the closure on an upper face, or on a side end of the container. The container may be box-shaped. The container is preferably rectangular box-shaped.

The container may have substantial mass in the base, the walls and/or the closure. The closure is preferably made from steel, welded as a strong box. The container is preferably a safe of extremely strong construction and resistant to unauthorised entry or removal.

The body of the container may comprise three or more walls and a top and base, made of thick plate steel, welded to define a box cavity corresponding to the container's interior. In particularly preferred form, the body is made up of two sheets of metal, folded to form the corners and further folded at the jamb in the form of internal reinforced beads that define, in section, polygonal or curved shapes, preferably square, rectangular or trapezoid. Preferably, the second edge is in the form of an internal bead that is adapted to trap a complementary bead formed on the free edge of the closure in the closed position.

The jamb defines the closure or door opening. And may include a separate frame or, advantageously for ease of manufacture, wall, floor and ceiling plates folded to reinforce and form the jamb. The container preferably has a single opening corresponding to the jamb. The opening is preferably on a side of the container corresponding to its front, although the door lock mechanism would work as a lid in the top of the container or a trap door closure for the floor.

Security Closure

The closure is adapted to securely seal the opening against unauthorised entry. The closure is preferably a door having a rigid and robust structure, resistant to warping or distortion that might be caused by a braced lever. The closure is made from one or more layers of steel plate and/or insulation.

The closure may have a front layer of metal extending across the front of the closure. The closure may have an internal layer of metal abutting the front layer around the closure's periphery and being folded internally to form walls for an internal box. The internal box preferably has four sides that house the opening and lock mechanisms of the closure. The front layer may be continuous with the guard member, the guard member being formed from the same front layer of metal.

The closure has a hinged edge corresponding to the first edge and a free edge that is free when the closure is in an open position, the free edge being adjacent to and/or abutting the second edge in the closed position.

Lock Assembly

The closure may have a lock assembly mounted on its interior face, or housed in the internal box forming a cavity or compartment within the closure when closed.

The free edge of the closure is preferably opposed to the first hinged side. However, there may be provided one or more bolts. An additional locking bolt may be provided in, near or adjacent a third or fourth edge normal to the hinged and free sides of the closure. The third or fourth edges may be upper and lower edges of the closure, respectively.

The locking bolt may include an elongate shaft. The shaft may be curved to travel through an arcuate path. The locking bolt may be actuated by a rotating mechanism operated by a rotatable handle. The shaft may be linear. The bolt may be adapted to reciprocally translate along a linear path, being trapped against lateral movement, but permitted to slide back and forth. The actuating mechanism may include a driven toothed wheel operably connected to the shaft and having corresponding teeth meshed with the wheel.

The actuating mechanism may include a rotatable plate operably connected to the handle by a common shaft. The bolt may be constrained for reciprocal substantially linear travel through an aperture in the guard member. An internal end of the bolt may be hingedly attached to a linkage comprising a rigid bar. The rigid bar may also be hinged attached at its opposed end to the rotatable plate. Accordingly, as the handle and rotatable plate are rotated, the linkage may urge the bolt towards an extended closed position at the outer end of its travel extending through the guard member. The bolt, in reverse, may travel to an open position in which the bolt is retracted so that it does not extend beyond the guard member and is housed in the internal box.

The bolt may comprise a hollow shaft. The bolt may include longitudinally aligned or spiral ribs for reinforcement and strengthening. The bolt is preferably solid and adapted to withstand strong lateral bending forces. The bolt is preferably made of steel. The bolt is preferably substantially solid cylindrical in form and may have a tapered leading free end to facilitate location in a corresponding aperture, recess or gap in the barrier member.

The guard member is preferably aligned in a plane transverse to the direction of reciprocal travel of the bolt. The guard member may be welded to the internal surface of the closure. The guard member may be formed from angle plating. The guard member may be formed from an L-angle with one arm of the angle welded to the internal surface of the closure. The guard member may be a continuous length extending substantially the full length of the free side of the closure.

The guard member is preferably formed continuously with the front closure skin, layer or plate. This facilitates ease of manufacture as the closure, barrier member and walls of the internal box may be formed from a pair of metal plates, folded and welded together.

In any case, the guard member preferably provides a guard substantially the full length of the free side with a view to resisting interposition of a lever or other tool used for unauthorised entry by insertion between the free side of the closure and the jamb. One or more lateral reinforcing studs may be included that extend across the slot between the barrier member and the jamb. The stud would otherwise interrupt the travel of the guard member into the slot. Therefore, to permit the guard member to enter into the slot, a gap in the length of the guard member may be provided. The continuity of the guard member along the length of the free side may therefore be interrupted by the gap to accommodate each of the lateral studs. The guard member is preferably positioned close to the jamb at the side of the opening corresponding to the second edge. This may be so that a sharp tool cannot be easily inserted, to any extent sufficient to allow leverage, into the space between the free side and the jamb. The guard member may be made from relative thick plate steel, such as about 2.5-5 mm, and preferably about 3 mm.

However, the spacing between the barrier member and the jamb at the opening's second edge defining the slot may be sufficiently wide to accommodate reciprocal movement of the closure substantially in the opening's general plane. To accommodate such reciprocal movement requires the slot may be of a width corresponding to the extent of the reciprocal movement, forward and aft in the opening's general plane.

The barrier panel extends adjacent to the jamb near the closure's free end when the closure is closed. The slot may be continuous without interruption from either location on or near the jamb that the barrier panel is attached to the body. The ends of the barrier panel may be inserted in a slot formed in the body for extra strength. Preferably, the upper and lower portions of the barrier panel are welded to internal surfaces of the body. The barrier panel may be made from thick metal plating as with the guard member, but is preferably made of thinner sheet metal, for example about 1-2.5 mm in thickness. For increased lateral strength and resistance against lateral forces, the barrier panel may be folded to form longitudinal grooves, ridges or flanges. The barrier panel may form part of a channel section shaped to include a wall flange attached to the body, and a bridge section intermediate and extending between the wall flange and the barrier panel. The one or more studs may also extend between the wall and the barrier panel to reinforce the outer free end of the channel constituting the longitudinal edge of the barrier panel closest to the closure.

The path of reciprocal travel of the bolt is adapted to intersect the barrier panel and the guard member when the closure is closed. The bolt may be received in a corresponding bolt hole formed in the body facing the free end when the closure is closed.

Therefore, when the closure is closed, the guard member provides a first obstruction to a would-be tamperer. The barrier panel provides a second wall to maintain stiffness of the guard member in the case of an attack with the guard member nesting in the slot.

The guard member and the barrier panel may not extend the full way across the jamb, but may be located in the zone of the one or more locking bolts. The upper and lower edges of the closure and the jamb may also be fitted with respective guard and barrier members, and one or more locking bolts. Therefore, a significant proportion of the closure is protected with the lock assembly. Whilst an intruder may jimmy and bend part of the closure in a portion spaced from the lock assembly, the intention of the invention is to restrict the intruder so that the intruder still remains unsuccessful in accessing the cavity and the container contents.

Hinge Device

The closure may be hung on and supported by at least one hinge device. The hinge device may be adapted to permit rotation of the closure at or near the first edge about a stationary axis. The hinge device includes at least two hinges in coaxial alignment, including an upper hinge and a lower hinge. The hinge device may be mounted by hinge wings or hinge knuckle joints and plates, to an internal wall, ceiling or floor surface near the first edge of the jamb on the body and to a surface of the closure not exposed when the closure is closed.

The hinge device may include a standard safe hinge assembly, wherein the closure rotates about hinges mounted to remain in a fixed axis near the first edge of the jamb. The hinge device may include a hinge with a stationary axis set back from the second edge and a hinge with a movable axis.

The hinge device may include an arrangement in which the closure is adapted to slide substantially in the plane of the opening before the closure may be moved to a position in which the free edge is free to rotate about the hinge device clear of the second edge. The hinge device may have multiple rotating axes and one of the hinge axes may be adapted to move relative to the body to space the hinged edge from the first edge.

The hinge device may comprise two or more hinges operating in parallel to one another and linked to each other. The hinge device may facilitate the rotation of the closure about multiple axes.

The hinge device may enable the closure to reciprocally travel in a plane substantially parallel to the plane of the opening whereby to move the closure panel from a closable position in which its free edge is behind the second edge, to an openable position in which the free edge lies within the space defined by the opening. In the closable position, the free edge may therefore sit behind the second edge, whereas, in the openable position, the free edge may be free to swing outwardly away from the second edge.

The door guard member may extend from a guard member base at or near an internal surface of the door. An exterior panel of the door may extend in the door plane beyond the guard member base to form an outer free edge, so that the door guard member forms a flange extending normal to the exterior and in a direction opposite to the exterior's face.

A pair of perpendicular walls of the second edge may define a corner recess that is adapted to receive the outer free edge. The outer facing wall preferably lies in a plane substantially parallel to the closure plane and the inner face of the outer free edge is preferably adapted to abut against it in the closed position. The outer facing wall may form part of a post behind which the bolts may extend in the closed position. This may further trap the bolts, in addition to the bolt-trapping operation of the barrier panel.

The barrier panel and the post may define a long, narrow slot therebetween. The slot is preferably at least sufficient in width to receive the door guard member at the end of its arc of rotation about the hinge device into the closed position. The door guard member may be substantially coterminous with the barrier panel in length. In the closed position, the door guard member and the barrier panel may include holes that are registered to receive a bolt extending into and optionally through the space defined by the slot.

The outer free edge is nested in the corner recess in the closed position and this provides a first defence against prying tools. The door post provides a second defence. The interlocking of the door guard member, barrier panel and the inserted bolts make unauthorised opening of the closure extremely difficult.

BRIEF DESCRIPTION OF THE SEVERAL VIEWS OF THE DRAWINGS

The invention may be better understood from the following non-limiting description of preferred embodiments, in which:

FIGS. 2*k*-2*l* are upper perspective views of the guard member of the second embodiment;

FIG. 3 is a schematic sectional plan view of the lock assembly of the first embodiment;

FIG. 4*a* is a partial side view of a hinge device according to a third embodiment;

FIG. 4*b* is a partial side view of a hinge device according to a fourth embodiment;

FIG. 5 is a sectional plan view of a handle mechanism and the hinge device according to the third embodiment;

DETAILED DESCRIPTION OF THE DRAWINGS

Figure 1A:
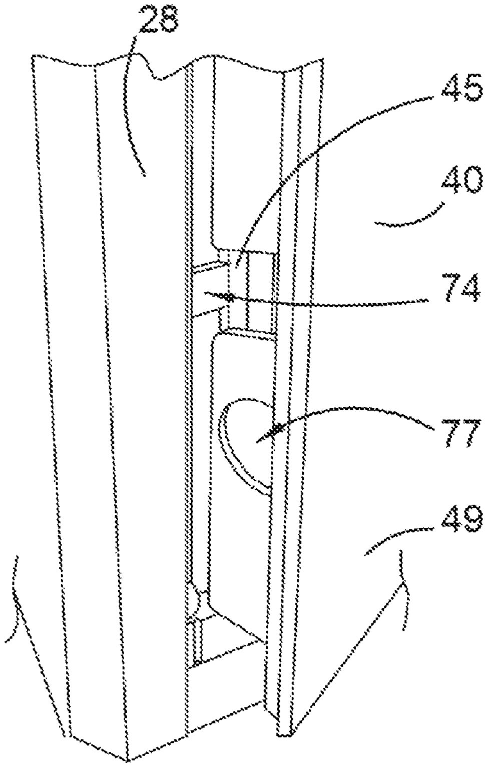
FIG. 1*a* is a perspective view of a locking assembly according to a first embodiment of the invention.
Figure 1B:
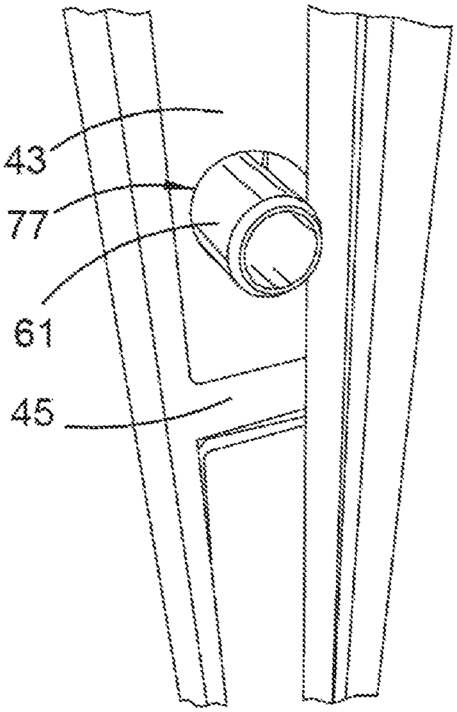
FIGS. 1*b* and 1*c* are a perspective views of a free end of a safe door according to the first embodiment.
Figure 1C:
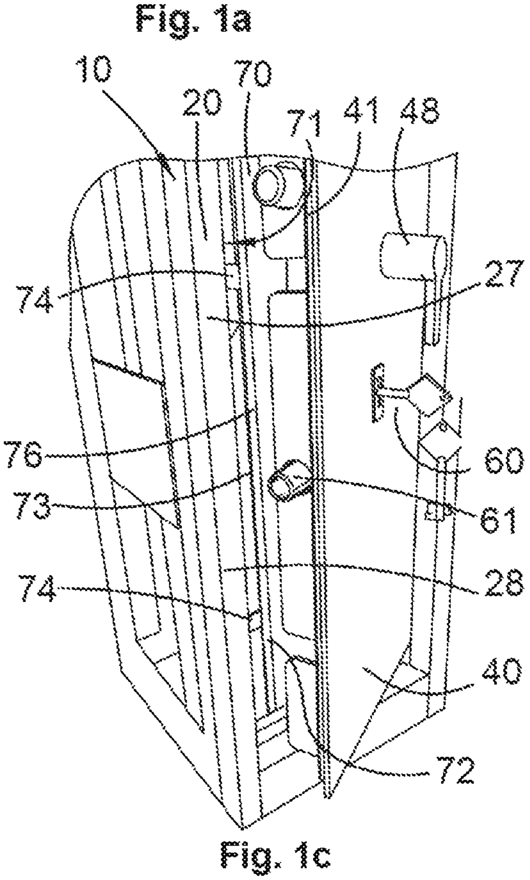
Figure 1D:
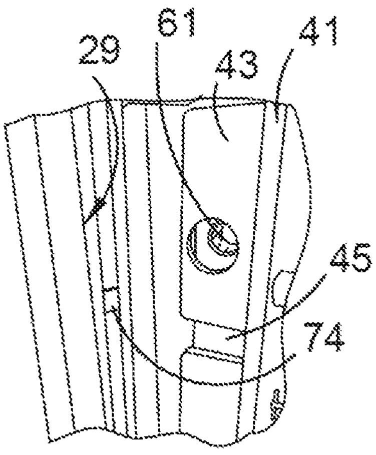
FIGS. 1*d*-1*e* are a perspective views of a free end of a safe door according to the first embodiment and the associated door jamb.
Figure 1E:
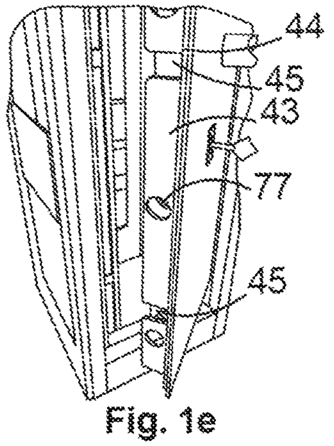

Preferred features of the present invention will now be described with particular reference to the accompanying drawings. However, it is to be understood that the features illustrated in and described with reference to the drawings are not to be construed as limiting on the scope of the invention, except as may be recited in the claims accompanying this specification.

Referring to FIGS. 1*a*-1*f*, a first embodiment is shown in which a gun safe 10 has a container body 20 (shown in open form with just a frame to display internal components and features) defining an internal container space or cavity 21, a hinged door 40 and a locking assembly 60. The safe 10 is a substantially rectangular-shaped block for the body 20, having a base 22, a rear wall 23, a pair of side walls 24 and a top 25, all defining the cavity 21, and an opening 26 defined by a door jamb 27.

The container body 20 has a number of apertures 29 formed in a bolt-receiving side 28 of the jamb 27 to receive a corresponding number of door bolts 61 extendable from a free end 41 of the door 40.

The locking assembly 60 has a rolled channel section 70 comprising a first "arm" 71 of the channel 70 that is welded top, middle and bottom of the length of the channel 70 to the body 20. The channel 70 has a second arm constituting a barrier panel 72 spaced from the first arm 71 and/or the jamb 27 a small distance of say 3-10 mm whereby to define a narrow longitudinal slot 73.

The slot 73 is adapted to receive a guard member 43 formed from multiple lengths of L-angle iron with one arm 44 of the angle iron welded to the internal surface of the door 40 adjacent the free end 41. The guard member 43 has interruptive gaps 45 spaced along its length. The gaps 45 are positioned to receive corresponding stud braces 74 extending across the channel 70 from the door jamb 27 to the barrier panel 72, whereby to reinforce the barrier panel against lateral flexing or distortion by providing a bracing strap for added strength. The free end 76 of the barrier panel 72 is also folded for extra strength against lateral forces.

The door includes a translation mechanism for the bolts 61*i* that is housed in an internal housing 40*ai* and further includes top and bottom guard flanges 43*ai* to protect the door lock assembly 20*i*,40*i*,60*i* from upper or lower attack, respectively.

When the door 40 is closed, the door bolts 61 come into registration of the bolt bore apertures 29. Corresponding apertures 47,77 are formed at the appropriate places along the respective lengths of the guard member 43 and the barrier panel 72. Therefore, on actuation of a rotatable handle mechanism 48 located on the exterior 49 of the door 40, the door bolts 61 and travel home along a linear pathway in registration with the apertures 29,47,77. The safe 10 is, of course, lockable by any of various means, such as a conventional lock requiring a key or a combination lock.

The position of the guard member 43 adjacent a line where the closed door 40 and the second edge 28 meet makes the insertion and successful jimmying at the line extremely difficult. Not only are the body 20 and the door 40 made of heavy plate metal resistant to distortion, but the free end 41 is reinforced by the door guard member 43, which in turn is strengthened in the closed door 40 position by the barrier panel 72, which is also strengthened against lateral distortion by the stud braces 74.

In FIGS. 2*a*-2*l*, a second embodiment is shown in which like features are labelled with like reference numerals with the addition of "i". The second embodiment does not include the stud braces 74, and therefore the guard member 43*i* is continuous in length substantially the full length of the second edge 41*i*. Accordingly, the guard member 43*i* is marginally stronger than the guard member 43, particularly at and around the gaps 45, but the trade off is that the barrier panel 72*i* is marginally less resistant to lateral forces.

The door 40*i* and opening 26*i* may not extend the full length of the safe 10*i*, but rather there may be a smaller opening positioned at the bottom, mid or top region of the container. Where the opening and door are substantially smaller than the overall length of the container, gains in economy of manufacture and increased strength may be achieved relative to a full-length door. A solid front extension wall 80*i* is preferably used to form the remainder of the front wall including the door. This is because a smaller door offers less leverage compared to a longer door. Of course, the size of the opening 26*i* is determined by the items to be housed in the safe 10*i*, so that a full-length door may be required for long items, such as long-barreled rifles.

The door 40*i* is mounted on hinges 30*i* which comprise pins 31*i* at the top 32*i* and bottom 33*i* edges of the door 40*i* and cooperate with corresponding pin apertures 34*i* (obscured in FIGS. 2*a*-2*l*) formed in the respective top 35*i* and bottom 36*i* of the door jamb 27 at a first hinge end 37*i* (obscured in FIGS. 2*a*-2*l*), so that the door 40*i* swings through an arcuate path rotating about a single and stationary axis 39*i*.

Figure 2A:
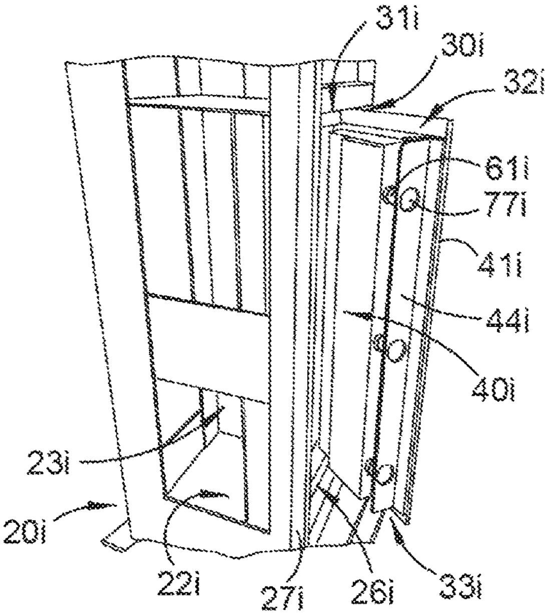
FIGS. 2*a*-2*e* are perspective views of the free end and the associated door jamb of a second embodiment.
Figure 2B:
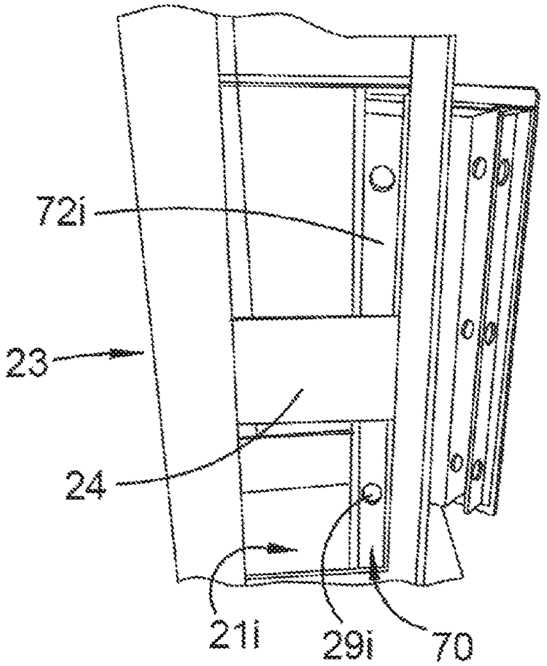
Figure 2C:
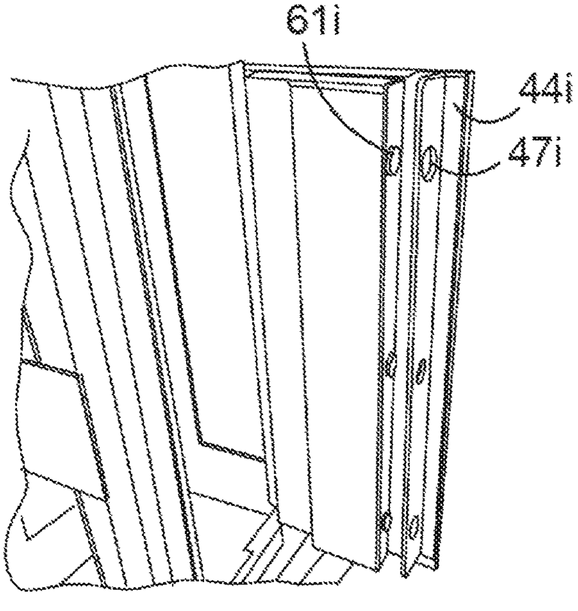
Figure 2D:
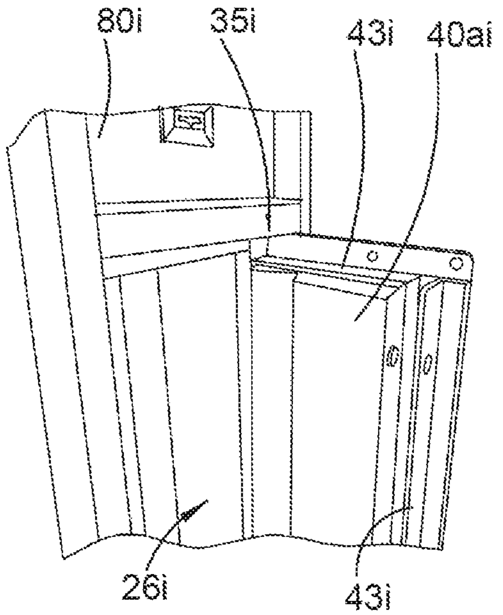
Figure 2E:
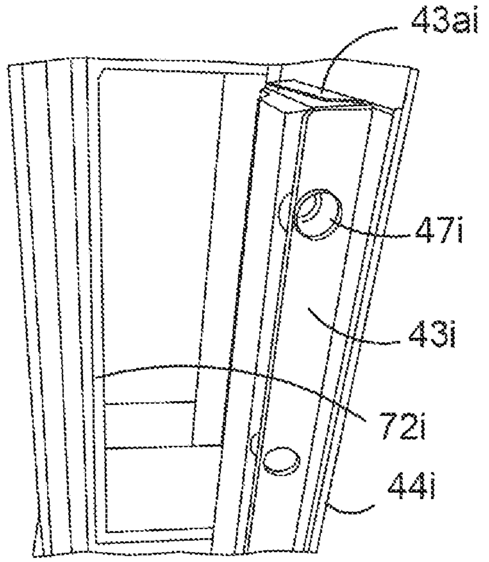
Figure 2F:
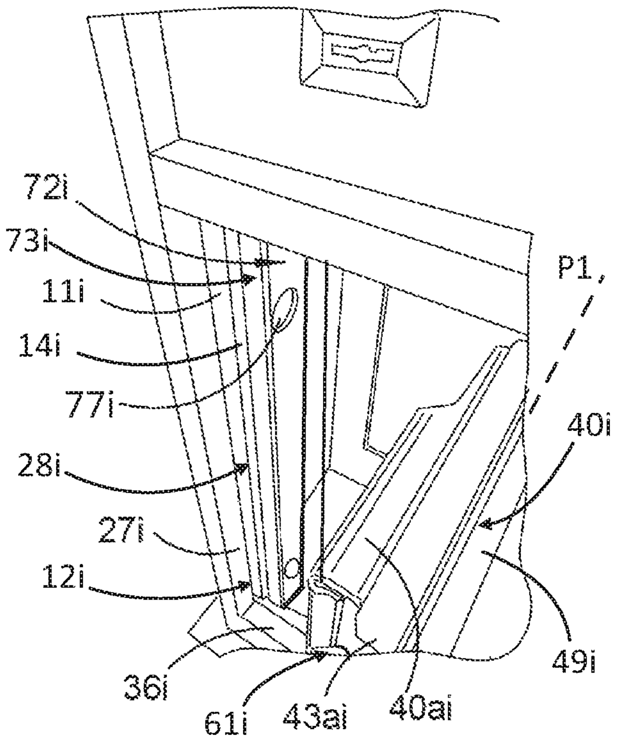
FIG. 2*f* is a perspective view of the barrier panel of the second embodiment.
Figure 2G:
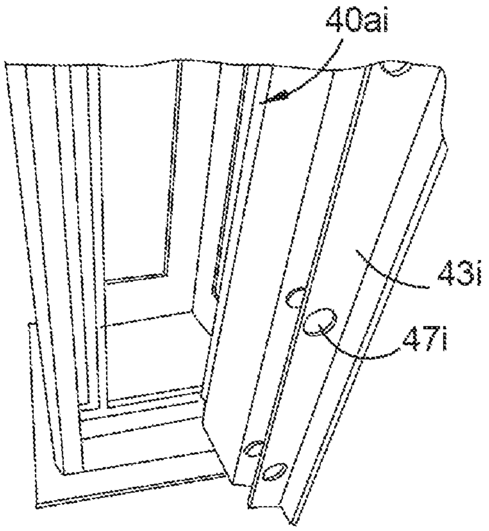
FIG. 2*g* is a perspective view of the door jamb of the second embodiment.
Figure 2H:
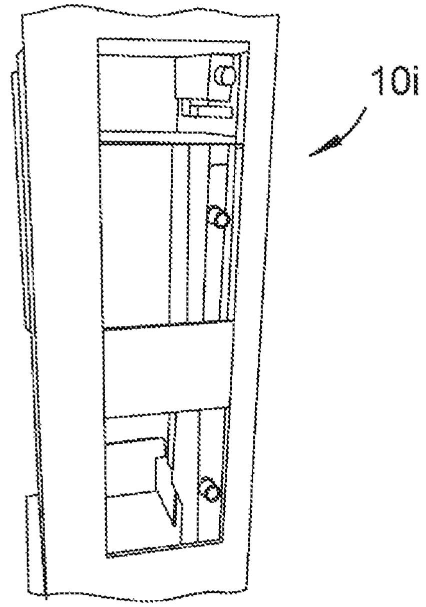
FIGS. 2*h*-2*j* are perspective views of the left, rear and rights sides of the second embodiment shown with the door closed.
Figure 2I:
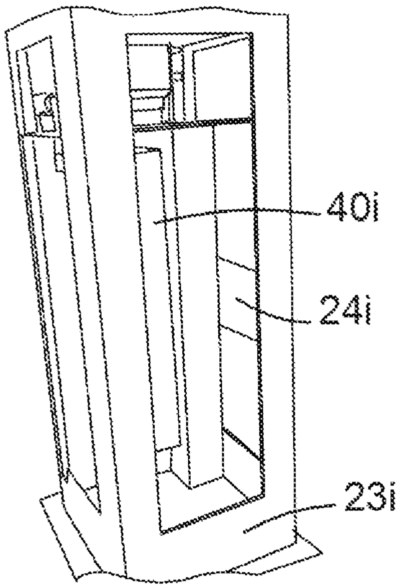
Figure 2J:
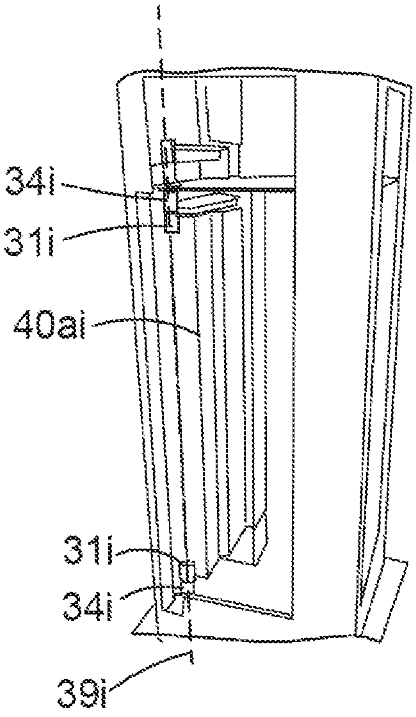
Figure 2K:
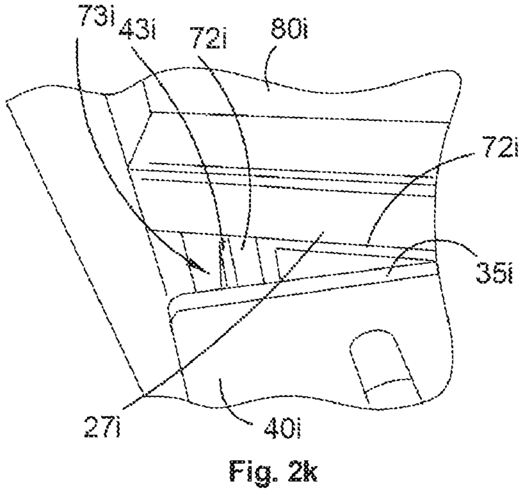
Figure 8:
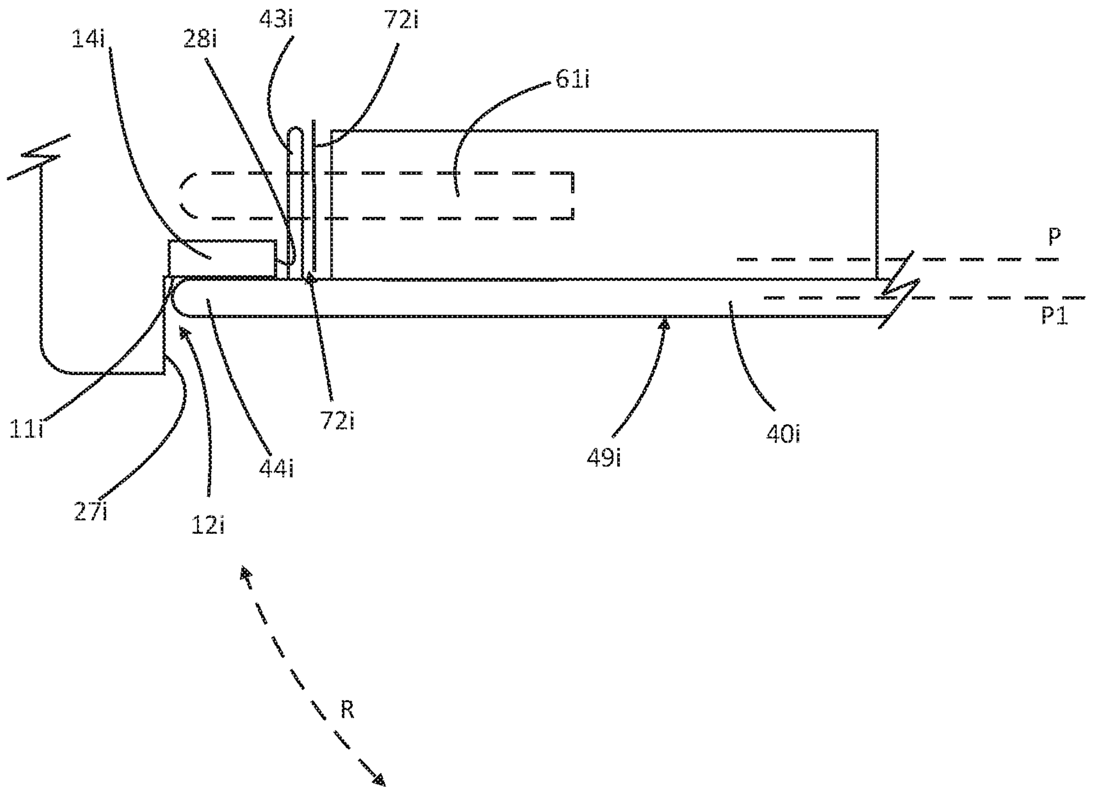

Referring particularly to FIGS. 2*f* and 8, a door guard member 43*i* extends from a base 42*i* at or near an internal surface of the door 40*i*. An exterior panel 49*i* of the door 40*i* extends in the door plane P1 beyond the base 42*i* to form an outer free edge 44*i*, so that the door guard member 43*i* forms a flange extending normal to the exterior 49*i* and in a direction opposite to the exterior's 49*i* face.

A pair of perpendicular walls 27*i*,11*i* of the second edge 28*i* define a stepped recess 12*i* adapted to receive the outer free edge 44*i*. The outer facing wall 11*i* lies in a plane substantially parallel to the closure plane P and the inner face of the outer free edge 44*i* is adapted to abut against it in the closed position. The outer facing wall 11*i* forms part of a post 14*i* behind which the bolts 61 extend in the closed position, further trapping the bolts 61, in addition to the operation of the barrier panel 72*i*.

Between the barrier panel 72*i* and the post 14*i* is defined a long, narrow slot 73*i*, at least sufficient in width to receive the door guard member 43*i* at the end of its arc of rotation R about the hinge device into the closed position. The door guard member 43*i* is substantially coterminous with the barrier panel 72*i* in length. In the closed position, the door guard member 43*i* and the barrier panel 72*i* include holes 47*i* that are registered to receive a fully extended bolt 61*i*.

The outer free edge 44*i*, nested in the recess 12*i*, provides a first defence against prying tools. The door post 14*i* provides a second defence. The interlocking of the door guard member 43*i*, barrier panel 72*i* and the inserted bolts 61*i* make unauthorised opening of the closure 40*i* extremely difficult.

Turning to FIGS. 3-5, the safe 10 includes the closure 40 engaged by the locking assembly 60 with the body 20. The closure includes an internal box or housing 40*ai* that houses the locking mechanism 60 and parts of the handle assembly 48 and a crank and linkage for the hinge device 30 (not shown). The housing 40*ai* partially houses the locking bolt 61 that is adapted to reciprocate along a linear pathway through registered apertures 29,47 formed in the guard and barrier members 43,70, respectively. In the sectional plan view, it can be seen that the second edge 28 is folded to achieve an outwardly facing channel 28*a* that is adapted to receive a vertically aligned inwardly facing free side flange 42. The flange 42 is formed from one folded external metal layer 46 and a folded edge that is continuous with the guard member 43. The flange 42 forms a first defence against unauthorised intrusion. The combination of the guard and barrier members 43,70 provide a second defence against approaches through the second edge 28*a*.

Figure 6A:
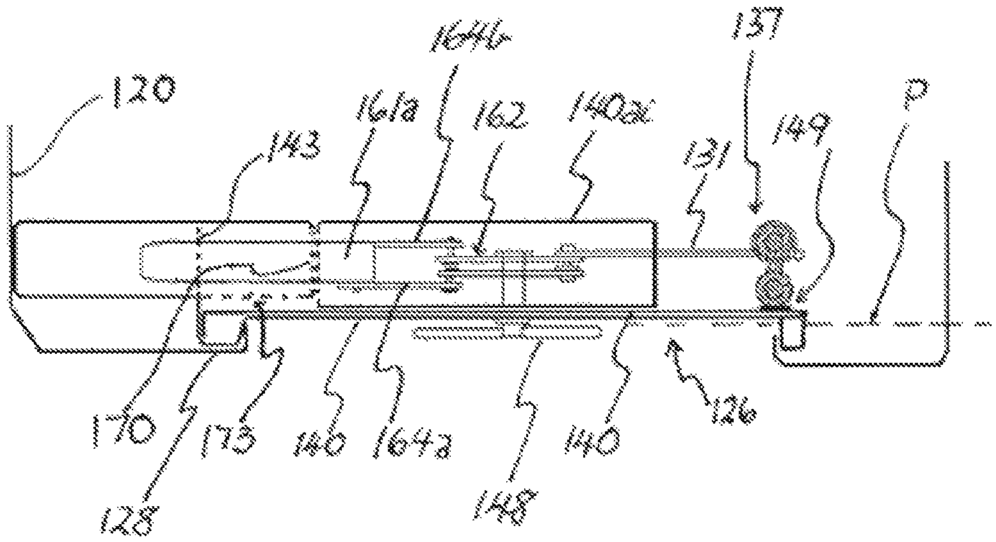
FIGS. 6*a-d* is a sectional plan view of the hinge device and locking assembly according to the third embodiment showing the sequence of steps in moving the door from a closed to an open position.

In FIG. 5, there is provided a preferred dual axis hinge assembly 130 adapted to permit a door 140 to reciprocally translate fore and aft along a substantially linear pathway substantially parallel to the general plane P of the opening 126 in which the closed door 126 lies as shown in FIG. 6*a*. The hinge device 130 includes a set of hinges 137, including first pair of hinges 130*a* pivotable about a first hinge axis $A_1$. The spaced hinges of the first pair of hinges 130*a* are separated by a vertical rod 132 to which a crank arm 131 is operably connected to cause the door 140 to travel relative to the hinge axis $A_1$ upon the rotation of a linked handle 148 (see FIGS. 5 and 6*a*). The hinge device 137 includes a second pair of hinges 130*b* rotated about a second axis $A_2$ spaced from and parallel to the axis $A_1$. the second pair of hinges 130*b* are either fastened through brackets 133 to the upper and lower regions of the internal surface of the door 140 at the hinge end or the hinges 130*b* are welded to the internal door surface 149.

Figure 7:
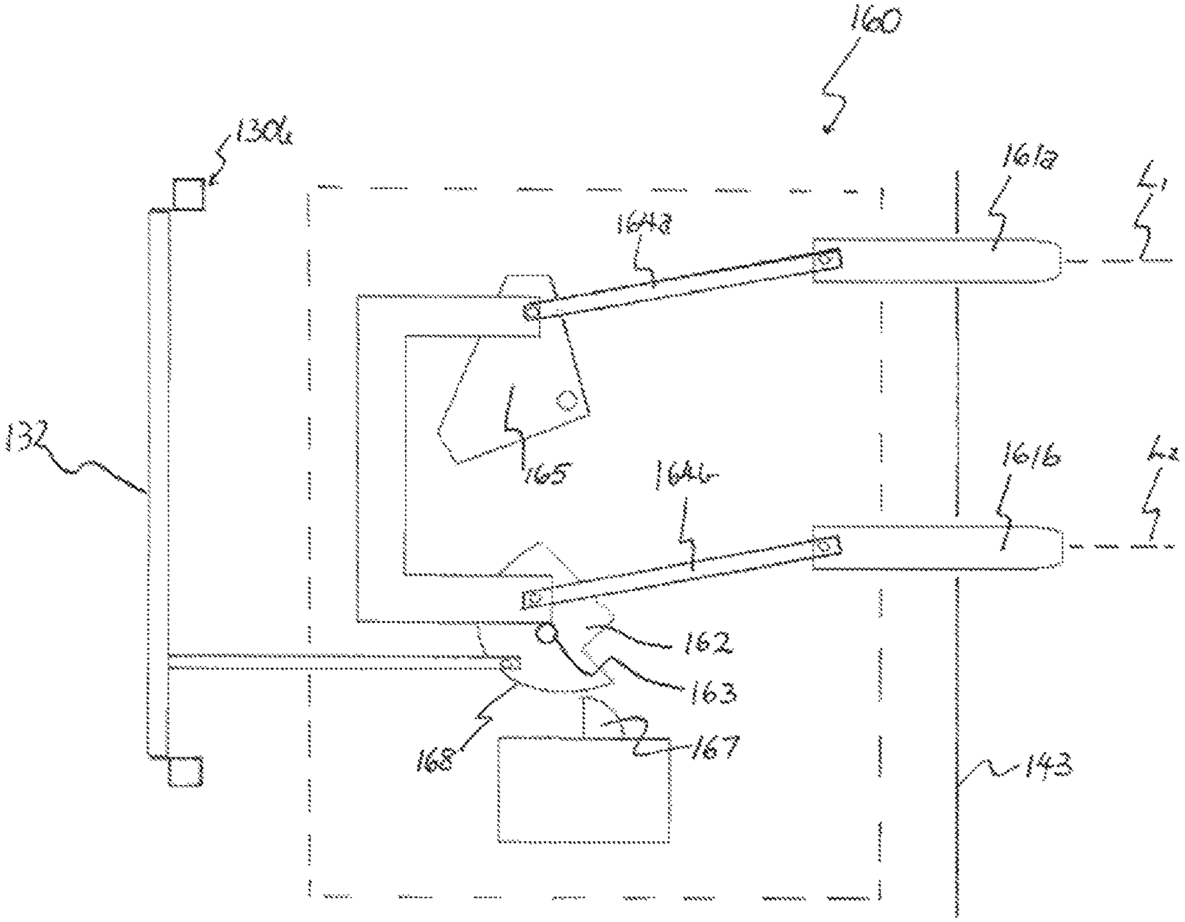
FIG. 7 is a schematic side sectional view of the handle and locking mechanisms according to the third embodiment and FIG. 8 is a schematic top plan and sectional view of the security door lock shown in FIG. 2*f*.

As best seen in FIGS. 6*a* and 7, the locking mechanism 160 includes a central plate 162 rotatable about a shaft 163 to which the handle 148 is operably connected. The central plate 162 controls the movement of both the hinge device 130 and hence the door 140, as well as the locking mechanism 160, which involves the reciprocating translation of the upper and lower bolts 161*a,b* along substantially linear pathways $L_1$, $L_2$, respectively by the control of parallel and coacting linkages 164*a,b*. The lower linkage 164*b* extends from the central plate 162, to which it is hingedly joined, to a linked inner end of the lower bolt 161*b* whereby clockwise rotation of the central plate 162 (anticlockwise rotation of the handle 148) causes the lower bolt 161*b* to travel outwardly along path $L_2$ towards insertion through the guard member 143.

The central plate 162 coacts with an upper rotational plate 165 for identical rotational movement by means of a rigid linkage arm 166 hingedly connected at either end to the plates 162,165, so that the pair of bolts 161*a,b* move in unison, parallel and to the same extent along respective paths $L_1$, $L_2$.

The guard member 143 is adapted, with the opening and closing of the door 140, to move into and out of the slot 173 defined by the second edge 128 and the barrier member 170. The barrier member 170 is spaced wide from the second edge 128 by a distance corresponding to the extent of travel of the door 140 (and hence the guard member 143).

Figure 6B:
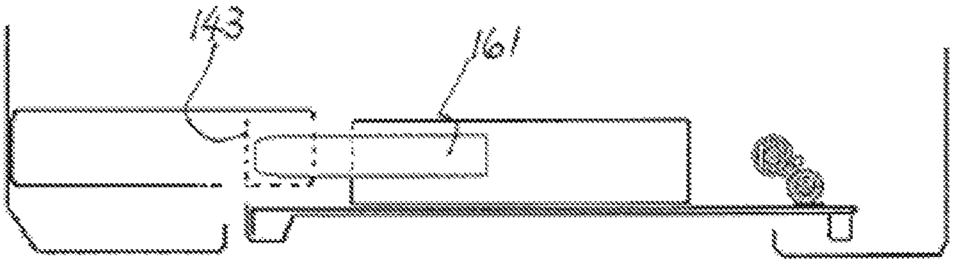
Figure 6C:
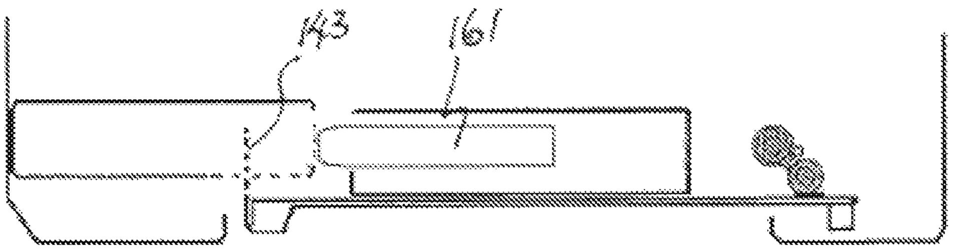
Figure 6D:
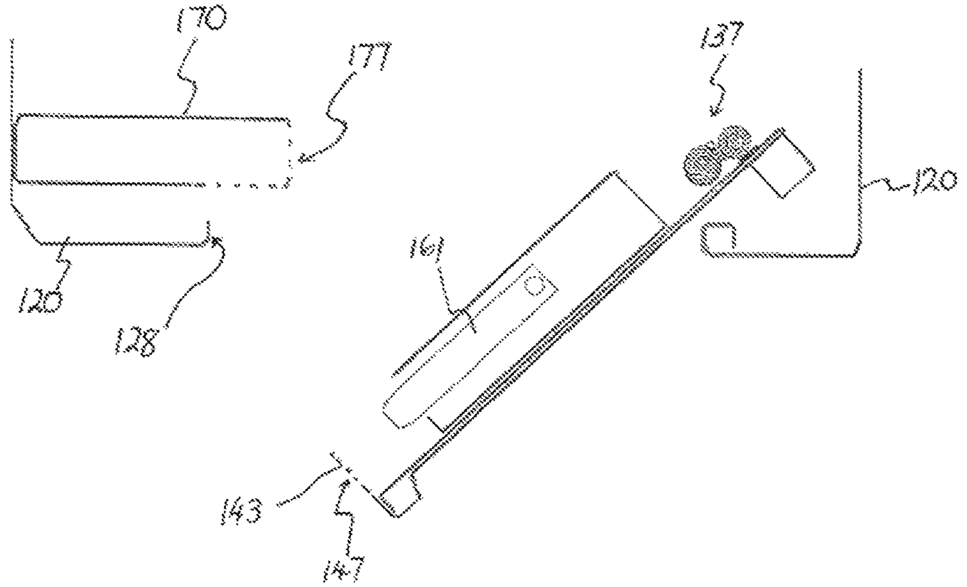

FIGS. 6*b-c* show, in sketch form, the movement of the bolts 161 and the door 140 in first retracting towards the hinged end (corresponding to the hinge device 137) until the guard member 143 is clear of the second edge 128 and the bolts 161 have exited the respective apertures 177 and 147 of the barrier and guard members 170, 143. The cavity of the container body 120 can then be accessed.

As shown in FIG. 7, the locking mechanism 160 includes a lock-controlled detent or pawl 167 that is spring biased to an upwardly extended position and is deflectable to allow the passage of a mutual cam surface 168 of the central plate 162 to allow the detent to spring into engagement with a complementary notch 169 formed in the exterior of the central plate 162 to lock same in place. A locking means, such as a conventional key or combination lock is used to retract the pawl 167 to release the central plate 162 for rotation and the opening of the safe 110.

In another embodiment shown in FIG. 8, the closure 240 is hung on and supported by a single axis hinge device 230. The hinge device 240 is adapted to permit rotation of the closure 240 at or near a first hinged edge about a stationary axis A1. The hinge device 230 includes at least two hinges 230*a* that are in coaxial alignment. The hinge device 230 is mounted by hinge knuckle joints and plates at or near the first edge of a jamb 237 and to a surface of the closure 240 not exposed when the closure 240 is closed. Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise. Orientational terms used in the specification and claims such as vertical, horizontal, top, bottom, upper and lower are to be interpreted as relational and are based on the premise that the component, item, article, apparatus, device or instrument will usually be considered in a particular orientation, typically with the top 25 uppermost.

The meaning of descriptive, precise or absolute terms such as "flexed", "normal", "parallel", "horizontal", "vertical" or "fully" includes the preceding qualifier "substantially or almost", unless the context or contrary is expressly indicated.

Qualifying relative terms, such as "relatively", "sufficiently", "near", "almost" or "substantially", may be taken to indicate a variation in an absolute value of between 0° and 10° or between 0% and 10%, relative to the absolute value. For example, "near horizontal" may be taken to mean any orientation between 0° and 10° relative to the horizontal.

In the present specification, the term "integral" means formed of one body in a single process. In particular, the term "integrally formed" means formed of the one body without post-forming attachment of separately formed component parts. That is, "integrally formed" and the similar term "unitarily formed" mean formed in a single forming process and do not include post-forming attachment of component parts by means of fastener or other component fixing substances or methods.

It will be appreciated by those skilled in the art that many modifications and variations may be made to the methods of the invention described herein without departing from the spirit and scope of the invention.

The invention claimed is:

1. A secure container having a security door lock comprising:

a body that has an interior;

a closure hingedly mounted on a hinged end to the body near a first edge of a jamb and having a closed position and an open position, the jamb defining an opening in the container;

a locking mechanism including locking bolts extendable from a free end of the closure and receivable in the body on or near a second edge of the jamb;

a guard member forming part of the closure and aligned along the free end, the guard member extends into the interior in the closed position;

a barrier member including a barrier panel that extends partially into the opening in a plane substantially parallel to the guard member; and a channel including the barrier panel spaced from the second edge to define a slot into which part or all of the guard member can be received;

wherein in the closed position:

the guard member includes an inwardly facing free end flange to provide a first defence against unauthorised intrusion;

the guard member extends substantially the full length of the free end into the container's closure space from the closure substantially in a plane transverse to the general plane of the closure with a view to resisting unauthorised entry by a tool inserted between the free end and the jamb;

the guard member provides a guard substantially the full length of the second edge with intermittent gaps to accommodate corresponding bracing studs extending between the second edge of the jamb and the barrier panel; and the path of travel of each of the locking bolts intersects the guard member and the barrier panel in the closed position, and in the closed position the corresponding bracing studs extend across the slot between the barrier panel and the jamb to permit the guard member to enter into the slot, with the continuity of the guard member along the length of the free end being interrupted by the gaps accommodating each of the corresponding studs.

2. The secure container of claim 1, wherein the closure has a front layer of metal extending across the front of the closure that is continuous with the guard member.

3. The secure container of claim 1, wherein the locking mechanism is mounted on an internal face of the closure.

4. The secure container of claim 1, wherein the locking mechanism is housed in an internal box forming a cavity and part of the closure.

5. The secure container of claim 1, wherein each of the locking bolts:

(a) includes an elongate shaft;

(b) is actuated by a rotating mechanism operable by a rotatable handle; and (c) slides back and forth in reciprocally travel.

6. The secure container of claim 5, wherein the guard member is aligned in a plane transverse to the direction of reciprocal travel of the locking bolts.

7. The secure container of claim 1, wherein the closure is formed substantially of two sheets of metal and the guard member is formed from part of one of the two sheets of metal.

8. The secure container of claim 1, wherein the guard member is formed from angle plating and is continuous in length extending substantially the full length of the free end.

9. The secure container of claim 1, wherein the closure is mounted to a multi-hinge device that permits the closure to reciprocally travel substantially in a plane corresponding to the opening.

10. The secure container of claim 9, wherein the barrier panel is widely spaced from the second edge of the jamb to accommodate the lateral travel of the guard member corresponding to the lateral travel of the closure.

11. The secure container of claim 10, wherein the hinge device has hinges aligned in first and second axes and the second axis of the hinge device moves laterally relative to the opening and between a position in the interior and well-spaced from the first edge and a position adjacent the first edge.

12. The secure container of claim 9, wherein a handle mechanism controls the lateral movement of the closure and the retraction or extension of the locking bolts by means of a central rotating plate and connecting linkages.

* * * * *